J. B. SMITH & P. DRUSHELLA.
TRACTION DEVICE FOR VEHICLE WHEELS.
APPLICATION FILED APR. 14, 1917.

1,262,118.

Patented Apr. 9, 1918.

Inventors
J. B. Smith
P. Drushella

By Watson E. Coleman
Attorney

UNITED STATES PATENT OFFICE.

JOSEPH B. SMITH AND PAUL DRUSHELLA, OF HUMBOLDT, IOWA.

TRACTION DEVICE FOR VEHICLE-WHEELS.

1,262,118.  Specification of Letters Patent.  Patented Apr. 9, 1918.

Application filed April 14, 1917. Serial No. 162,101.

*To all whom it may concern:*

Be it known that we, JOSEPH B. SMITH and PAUL DRUSHELLA, citizens of the United States, residing at Humboldt, in the county of Humboldt and State of Iowa, have invented certain new and useful Improvements in Traction Devices for Vehicle-Wheels, of which the following is a specification, reference being had to the accompanying drawings.

This invention relates to an improved traction device for vehicle wheels and has for its primary object to provide a very simple and effective means which may be easily and quickly applied to or removed from the vehicle wheel and which, when in its applied position, will afford the necessary tractive engagement of the wheel with icy or muddy road surfaces so that the propelling force may be fully utilized for the movement of the vehicle.

And the invention has for another and more particular object the provision of a device for the above purpose embodying a metal ring or annulus, and a plurality of tread chains adapted to be connected at their extremities to said ring in such manner that the chains will be disposed normally on oblique angles across the tread surface to more effectively retain the chains in their applied position and hold the same against bodily circumferential movement upon the wheel tire.

It is a further object of our invention to provide a traction device of the above character which is simple and durable in its construction, may be manufactured at relatively small cost, and is particularly serviceable and efficient for application to wheels of heavy motor trucks.

Figure 1:
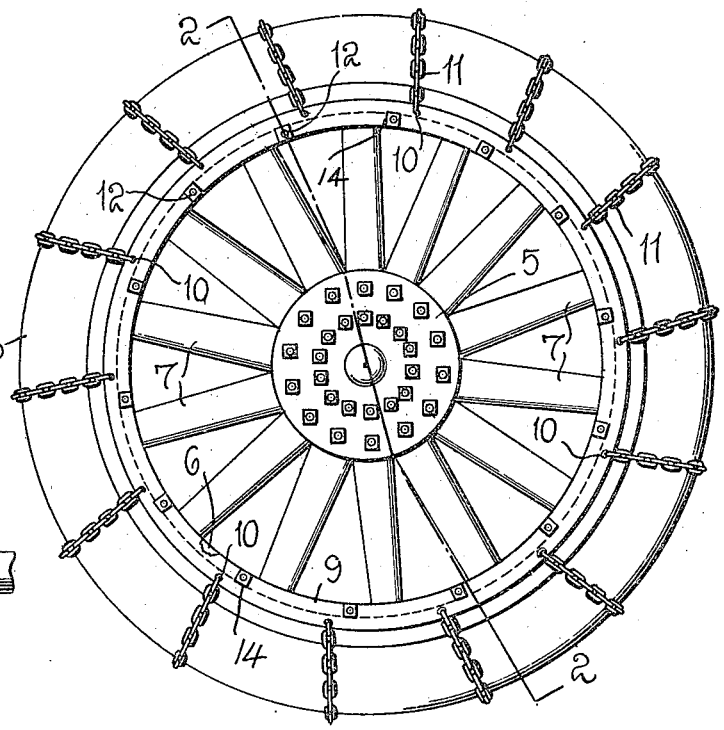
Figure 2:
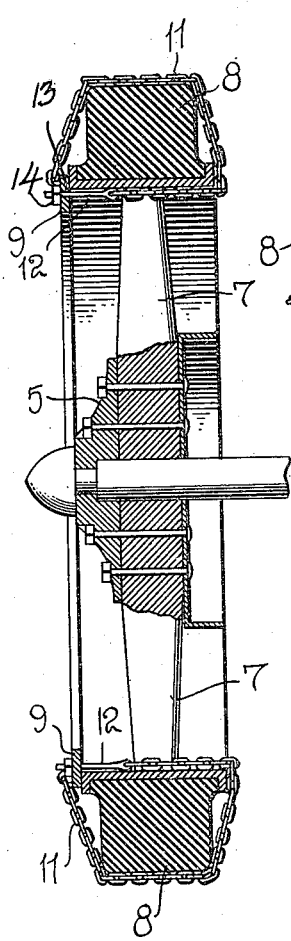

With the above and other objects in view, our invention consists in the novel features of construction, combination and arrangement of parts to be hereinafter more fully described, claimed, and illustrated in the accompanying drawing, in which, Figure 1 is a side elevation illustrating the preferred embodiment of the invention applied to a vehicle wheel;

Fig. 2 is a section taken on the line 2—2 of Fig. 1; and

Figure 3:
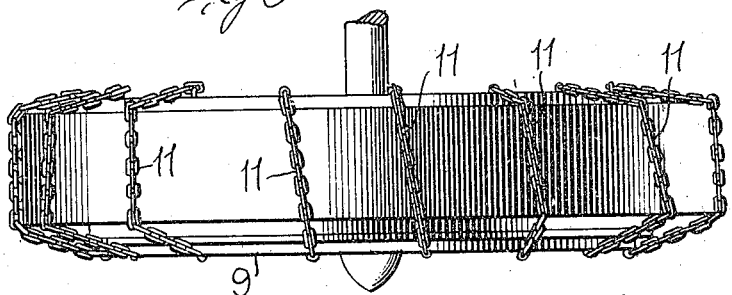

Fig. 3 an edge view of the wheel.

Referring in detail to the drawing, 5 designates the hub portion of the wheel, 6 the channeled rim, and 7 the radially disposed spokes rigidly connecting the hub and rim. A solid rubber tire 8 of any suitable form or construction is securely fixed in any approved manner within the channel of the rim 6.

Our improved traction device includes a flat metal ring or annulus 9 which is provided adjacent its outer edge with a plurality of equidistantly spaced apertures 10. The terminal links of the tread chains 11 are engaged through the respective apertures 10 in the annulus 9, and to the other terminal link of each chain, the eye formed on one end of a bolt 12 is loosely connected.

The ring or annulus 9 is further provided with a second series of openings 13 adjacent its inner edge, which are also equidistantly spaced from each other and are likewise disposed out of radial alinement with the adjacent aperture 10 in the ring.

As shown in Fig. 2 of the drawing, the ring or annulus 9 is arranged contiguous to the outer flange of the channeled rim 6 of the wheel, and the chains 11 are engaged over the tread of the wheel tire 8 and extended under the rim 6. The threaded shanks of the bolts 12 are then inserted through the respective openings 13 in the ring or annulus 9, and nuts 14 are threaded upon the bolt shanks to draw the same through said openings and tightly clamp the chains 11 upon the tread surface of the tire. The tread chains being disposed obliquely across the wheel tread, effectually prevent sidewise skidding or slipping movement of the wheel, and also afford a secure tractive engagement of the wheel with the road surface.

From the foregoing description, taken in connection with the accompanying drawing, the construction, manner of operation, and several advantages of the invention will be clearly and fully understood. The device while exceedingly simple, has been found highly effective and efficient in practical use. It can also obviously be produced at small manufacturing cost and can be very easily and quickly applied to the wheel or removed therefrom.

While we have shown, for the purpose of illustration, a particular construction of vehicle wheel, it will of course be manifest that our device is applicable to various types of wheels such as are employed upon automobiles or heavy motor trucks. Also, any desired number of the tread chains may be employed and other types of link chains from that illustrated can be used. Therefore, while we have shown and described the preferred construction and arrangement of the several elements, it is to be understood that the device is susceptible of considerable modification therein and we, therefore, reserve the privilege of adopting all such legitimate changes as may be fairly embodied within the sprit and scope of the invention as claimed.

Having thus fully described our invention, what we desire to claim and secure by Letters Patent is:

The combination with a vehicle wheel, of a rigid metal ring engaged against the outer side of the wheel rim, a series of tread chains permanently connected at one of their ends to the ring, and means for detachably connecting the other ends of the chains to the ring at points in spaced relation to the permanently attached ends of the chains, whereby the chains are caused to normally extend obliquely across the wheel tread, the latter ends of the chains being disposed upon the inner side of the wheel rim and exerting a lateral pull upon the ring to hold the same in close engagement with the wheel rim.

In testimony whereof we hereunto affix our signatures in the presence of two witnesses.

JOSEPH B. SMITH.
PAUL DRUSHELLA.

Witnesses:
F. C. LOVRIEN,
F. B. JACOBSON.

Copies of this patent may be obtained for five cents each, by addressing the "Commissioner of Patents, Washington, D. C."